United States Patent [19]
Erlitz

[11] 3,948,450
[45] Apr. 6, 1976

[54] VALVE-LESS PUMP FOR LIQUID MANURE

[76] Inventor: Frank E. Erlitz, Rte. 1, Box 234A, Somerset, Wis. 54025

[22] Filed: Oct. 3, 1974

[21] Appl. No.: 511,628

[52] U.S. Cl. ............... 241/46 R; 241/46.17; 241/97; 241/185 A
[51] Int. Cl.² ......................................... B02C 23/26
[58] Field of Search ............ 241/46 R, 46.02, 46.04, 241/46.11, 46.19, 97, 98, 185 A, 246, 282.1, 282.2, 292.1; 259/6; 214/16 R; 415/121 B, 148

[56] References Cited
UNITED STATES PATENTS

| | | | |
|---|---|---|---|
| 3,318,248 | 5/1967 | Rembold | 241/46.17 X |
| 3,417,929 | 12/1968 | Secrest | 241/246 X |
| 3,537,659 | 11/1970 | Vagedes | 241/97 X |
| 3,707,334 | 12/1972 | Ohlsson et al | 415/121 B |

FOREIGN PATENTS OR APPLICATIONS
1,146,299   3/1963   Germany ............................ 415/148

*Primary Examiner*—Granville Y. Custer, Jr.
*Attorney, Agent, or Firm*—Harold J. Kinney

[57] ABSTRACT

A liquid manure pump which, without the use of valves, can alternately be used for agitating and mixing liquid manure in a pit and for discharging liquid manure from the pit into a tank or vehicle for transport. The impeller of the pump is ordinarily driven by an electric motor attached to the frame of the pump apparatus, and knives which are fastened to the hub of the impeller and rotate with the impeller blades stick through the inlet port of the impeller housing to cut up solids and, by virtue of their shape, to force-feed the pump.

4 Claims, 11 Drawing Figures

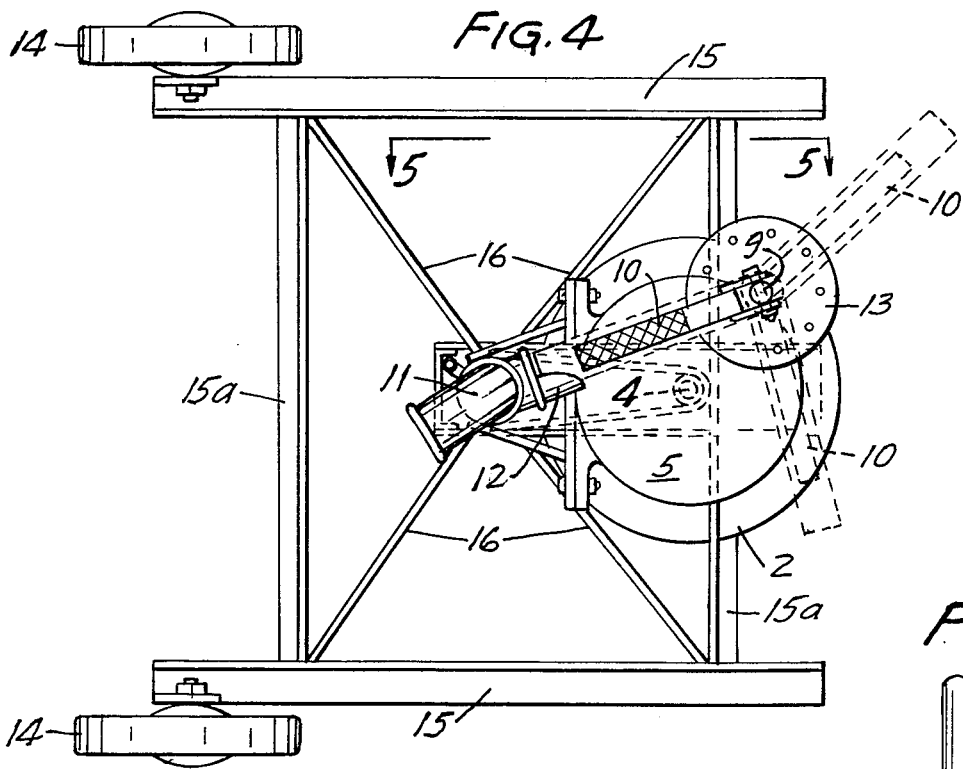
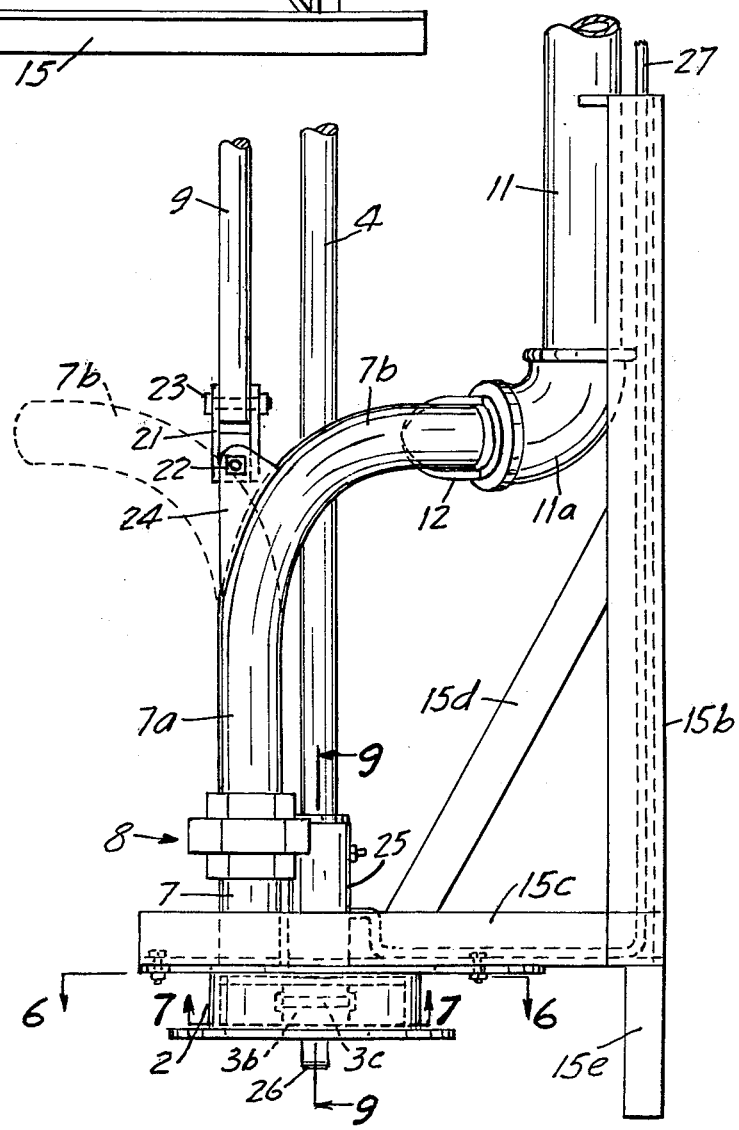
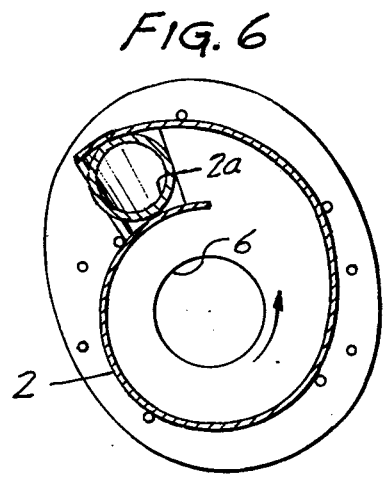
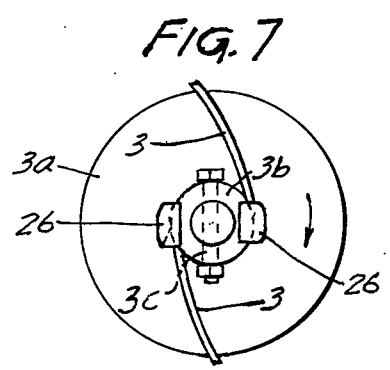

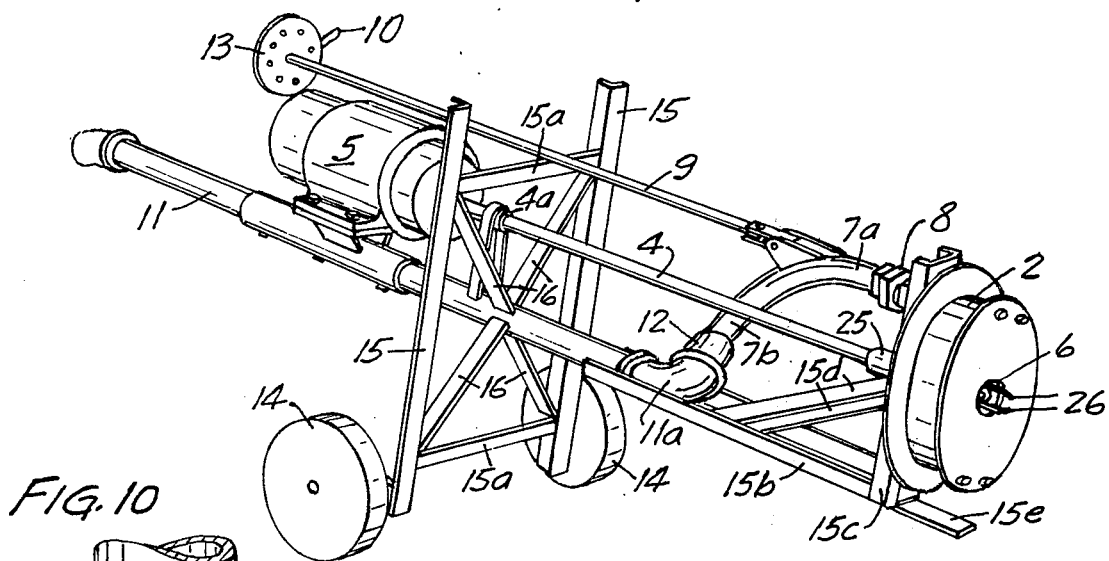
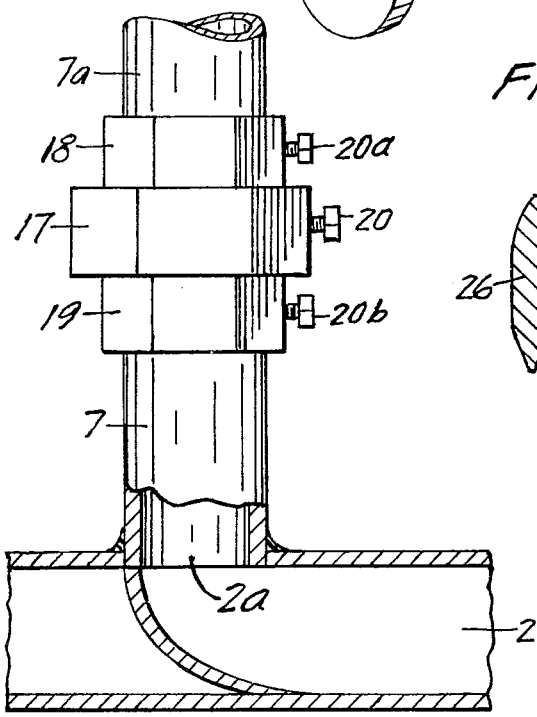
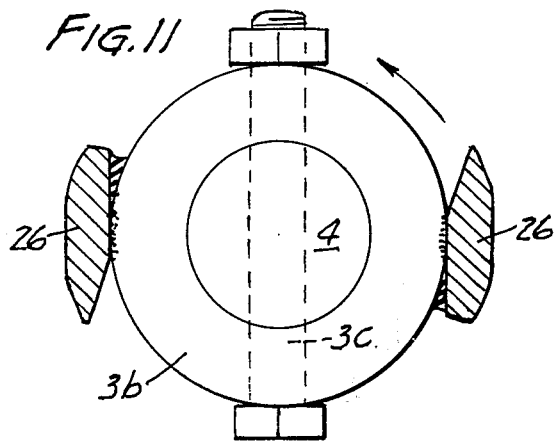
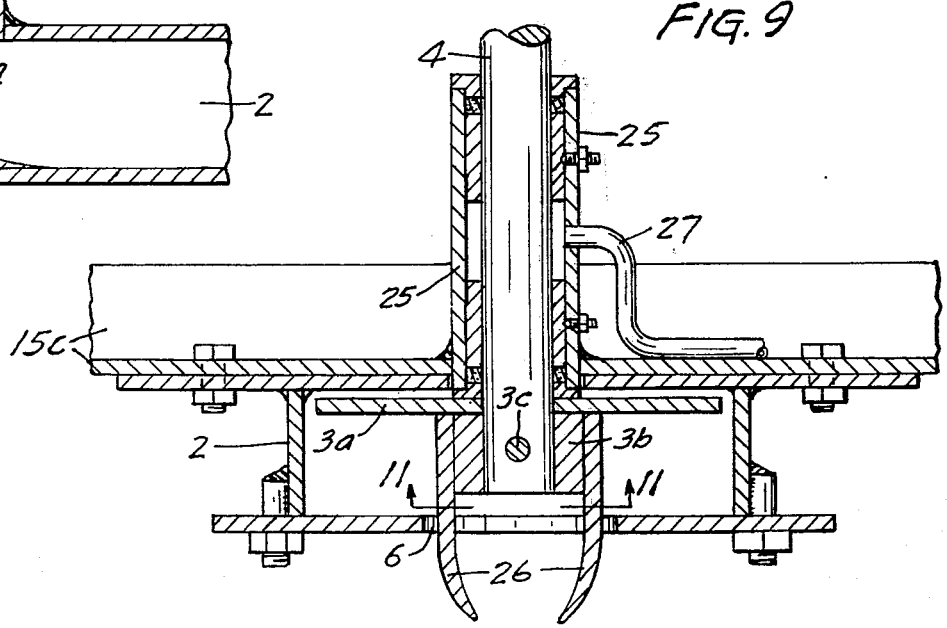

VALVE-LESS PUMP FOR LIQUID MANURE

BACKGROUND OF THE INVENTION

This invention relates generally to the handling and transfer of liquid manure and more particularly to a novel pump for agitating the liquid manure and when desired, for pumping it from a storage compartment or pit, without the use of valves.

In modern times it has become relatively common to dispose of manure in liquid form, from beef cattle feeding sheds, hog barns, dairy barns, etc. As generally pointed out in Nesseth U.S. Pat. No. 3,687,311, col. 5, line 40 et seq., the manure may be stored in a manure pit during the winter season and then pumped out and spread on the ground at a time when ground conditions prevent loss from runoff and prevent downstream pollution, probably especially by animal phosphates.

A manure pit, e.g. 4 to 8 feet deep, may be, and often is, located beneath a cattle feeding shed or barn, having a floor made up of concrete beams, e.g. 4 to 6 inches wide, with adjacent beams being located about one inch or more apart, to allow the manure to pass through to the pit and to permit washing down dirt with a hose. However, the manure pit or storage compartment, where desired, may be exterior to a barn or shed or beneath a feed lot.

When the time comes to remove the liquid manure from the pit, for spreading on the land, it is commonly pumped into a mobile tank which may be pulled by a tractor (or be mounted in a truck) and which is equipped with a spreader powered by a power takeoff (PTO) from the tractor. It is necessary to pump the manure from the normally depressed compartment or pit into the tank. However, before pumping the liquid manure from the pit into the tank, it is desirable first to agitate and mix the liquid manure in the pit so as to incorporate the solids and to develop a reasonably uniform slurry; because when the manure stands for weeks or months, its mineral content tends to settle to the bottom and fibrous material to come to the top, with liquid in between.

Pumps, introduced into the pit through a pumping port and supported on the adjacent surfaces around the porthole, have been in use which can be employed to agitate and mix and, when ready, then to pump the liquid manure through a discharge pipe to the tank or truck. These pumps commonly have two pipes connected to the impeller housing of the pump, one for agitation and the other for discharge or loading. Commonly gate valves are used to cut off passage through the discharge pipe when agitation is desired, and to cut off passage through the agitation pipe when discharge is desired. Both pipes are subject to the pressure of the pump and, if a valve does not close fully, material will continue to pass through it. Because of this, it often happens that after the valve is closed in the discharge pipe, and a tank that has been loaded has pulled away, liquid manure continues to leak through the valve into the discharge pipe and from it onto the ground in the loading area. This is obviously messy and annoying.

Because of these difficulties, one suggestion has been that two pumps should be used, one for agitation and another for discharge, thus to avoid difficulty with incomplete closing of the discharge valve. This suggestion is quite impractical because of the considerable increase in expense, as an extra pump of adequate capacity may cost another $2,000, or $3,000, or more. Obviously a dairy farmer or cattle feeder does not want to double his cost for pumps, or undergo the inconvenience of changing the power from one pump to the other with a change from loading to agitation, or vice versa.

These prior pumps have commonly been driven from the power takeoff of a farm tractor.

I am also aware that there are pumps of the centrifugal type which are valve-free, but none of these that I know of, with the possible exception of the Blum German DAS 1146299, will serve the dual function of alternately agitating and discharging liquid manure. The German DAS has never led to any usage in this country, to the best of my knowledge. The reason for such non-use seems apparent when one examines the structure disclosed in the Blum publication. As pointed out above, when manure stands in a pit, its mineral content tends to settle to the bottom and fibrous material to rise to the top, with liquid in between. It is undesirable in an effort to effect agitation or mixing, if not unworkable, to have an agitation nozzle, or the output of the pump, directed into the relatively solid mineral layer. Much more effective agitation is secured by directing the output from the pump, in a stream, above the mineral or relatively solid lower layer, whereupon the turbulence in the liquid material gradually draws solid material from the bottom layer into it and forms a relatively uniform slurry.

Further, the Blum publication proceeds on the theory that the pressure side of his pump or impeller, as the same is rotated, can be made to selectively register with any chosen sludge line or the feed line. Practically speaking, considering the irregularities to be expected in the floor surface of a liquid manure pit or the like, Blum provides no practical way to accomplish such registry. His sludge lines and discharge or feed pipe are not combined in a unitary structure with his pump, and his sludge lines are not adapted to be moved from pit to pit with his pump.

Summary of the Invention

The present invention provides an improved pump, adapted for use with liquid manure or other liquid slurries, which is valve-free and serves the dual function of agitation and loading. It is preferably driven by an electric motor, which is part of the pumping apparatus. The elimination of valves is accomplished by having a pipe extending from the impeller housing of the pump and curved around, e.g. at approximately a right angle, and adapted to turn (normally in a generally horizontal plane when in use) so to connect with the discharge pipe or, as desired, to point in various directions for agitation and mixing of the liquid manure. Cutting knives desirably extend out through the inlet port of the impeller housing and are shaped so as to force-feed the impeller or pump, as well as to cut up fibrous and other solid material.

Brief Description of the Drawings

An illustrative embodiment of my invention may be quickly understood by reference to the accompanying drawing in which:

FIG. 4 is an enlarged top elevational view of the apparatus of FIG. 1;

FIG. 5 is an enlarged detail of the lower portion of the apparatus of FIG. 1, viewing it on line 5—5 of FIG. 4;

FIG. 6 is a crosssectional view of the impeller housing (with the impeller and collar removed) taken on line 6—6 of FIG. 5;

FIG. 7 is a sectional view, showing the impeller blades, taken on line 7—7 of FIG. 5,; but with the impeller housing 2 omitted;

FIG. 8 is a perspective view of my pump supported on its wheels, approximately at a right angle to its verticle position as shown in FIG. 1;

FIG. 9 is a verticle section on line 9—9 of FIG. 5;

FIG. 10 shows a detail, partly in section, of the outlet from the impeller housing into the nipple or pipe 7; and FIG. 11 shows an enlarged view taken on line 11—11 of FIG. 9, (with the impeller blades 3 not showing).

Description of a Preferred Embodiment

Figure 1:
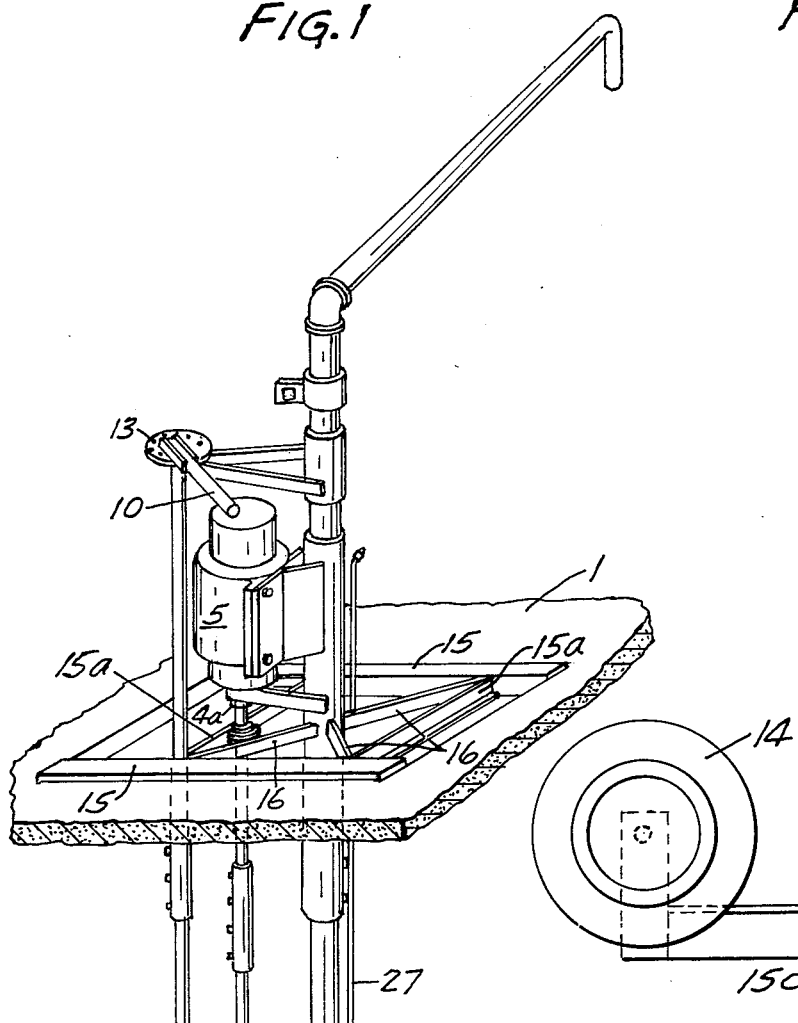
FIG. 1 is a perspective view of my pump, extending through a pumping port into a manure pit, with the floor surface shown broken away, the upper portion of the frame of my pump resting on the surfaces surrounding the port.
Figure 2:
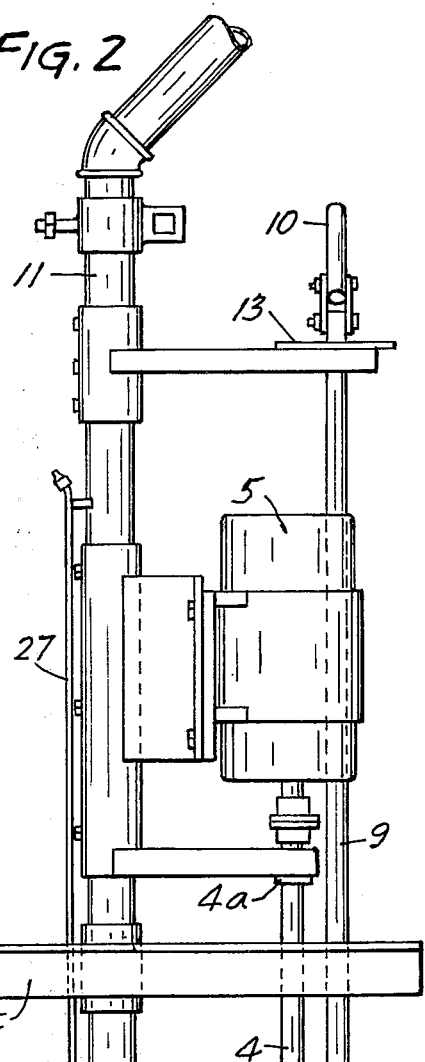
FIG. 2 is a somewhat enlarged side elevational view of the apparatus of FIG. 1.

Referring more in detail to the drawings, in which like reference characters denote similar parts, and first particularly referring to FIGS. 1 and 2, 1 is the floor or other surface which surrounds a square opening or porthole through which the lower portion of my pump is inserted into a manure pit which underlies the floor. At the lower end of my pump is the impeller housing 2 having therewithin an impeller 3 (shown in FIG. 7). The impeller is driven through shaft 4 by electric motor 5, wired to a suitable power source. The pump takes in liquid or slurry through opening 6 in the impeller housing 2 (see FIGS. 8 and 9) and drives it out through opening 2a into nipple or pipe 7 having a swivel joint 8 connecting it to pipe 7a. By turning control shaft 9 with handle 10 the end 7b of pipe 7a may be turned so as to register with the discharge pipe 11 at its mating end or nipple 12 for discharge of liquid manure to a mobile tank or truck for removal to the land; or, as desired, the end 7 b may be rotated (in an approximately horizontal plane) by control shaft 9 and handle 10 to various desired positions for agitation of the liquid manure. The handle may be retained in a chosen position by having a peg or pin, not shown but fastened to and protruding from the lower side of the handle, inserted in a selected one of the holes shown in horizontally disposed stationary plate 13.

As shown in FIG. 8, when my device is not inserted in a manure pit, it may be moved around a yard or floor on its wheels 14; and, when inserted into a manure pit, the frame 15 and 15a (fastened to the discharge pipe 11 with flat iron straps 16) will limit the depth of insertion by resting on the floor which surrounds the pumping port, e.g. element 1 in FIG. 1.

When in use in a liquid manure pit, it is normally desired to have the impeller housing 2 located near the bottom of the pit. My device may be built with the discharge pipe 11, the drive shaft 4 and the control shaft 9 each just the right length for a pit which is, for example, 4 feet deep, or just the right length for a pit which, for example, is 8 feet deep; or, where desired, each of elements 11, 4 and 9 may be of telescoped construction, or supplied with a connector sleeve, so as to provide for inserting the impeller housing 2 to a lesser or greater depth in the pit. The telescoped sections or sleeves may be held in place by set screws unnumbered but shown on each of elements 11, 4 and 9: see FIG. 1.

Figure 3:
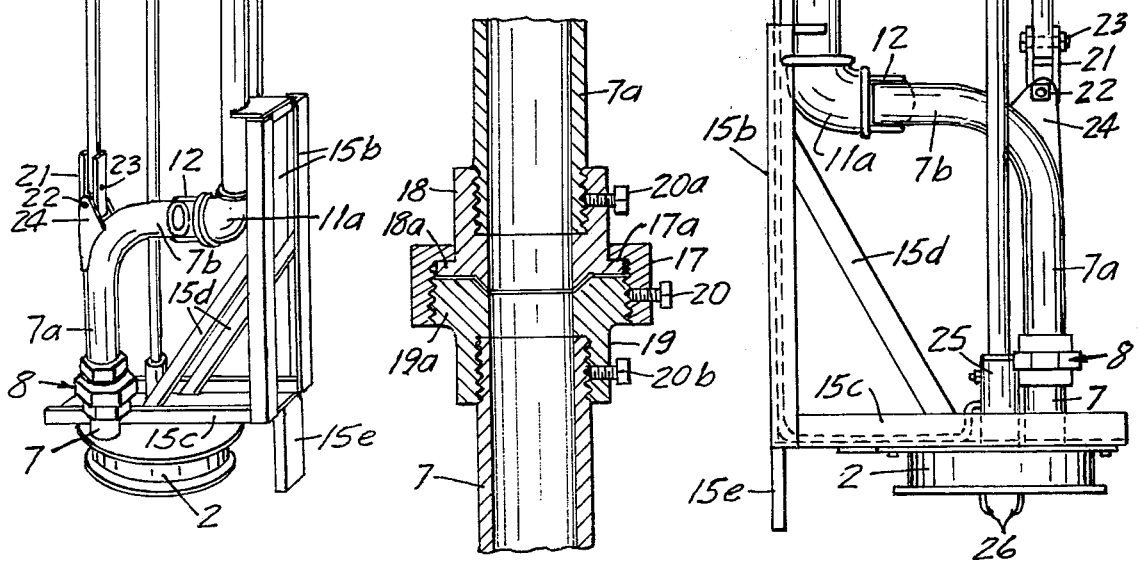
FIG. 3 is an enlarged detailed sectional view of the swivel connection 8 shown in each of FIGS. 1, 2 and 5.

FIG. 3 is an enlarged detailed sectional view of the swivel joint 8 (shown in each of FIGS. 1, 2, 5 and 8). It is a pipe union in which the internally threaded large nut or collar 17 has a shoulder 17a against the inner surface of which head 18a of internally threaded nut 18 fits in slidable or rotatable relation. Internally threaded nut 19 has an externally threaded enlarged end 19a, which screws into nut 17. The internal threads of nut 19 are screwed onto the threaded end of pipe 7 and nut 18 is screwed onto the threaded end of pipe 7a.

Pipe unions, such as that shown in FIG. 3, commonly have close tolerance, wide machine-faced surfaces on the inside, and one side of the connection or surface of the union is brass-faced. Such unions are normally used for tightfitting stationary connections. However, I have found a way of adapting such a union to make it a turning connection, by the following procedure: The union collar or connector 17 is tapped with a ⅜ inch thread. A cap screw 20 is inserted in this thread, with locking nut. When the union is connected by turning down the collar 17 until the two machined faces on the inside (one brass and one steel) make contact, the collar is then slightly backed off so that the machined faces can be freely rotated with respect to each other, but still provide a relatively firm connection. Then the cap screw 20 is turned in to make contact with the external threads of enlarged end 19a of nut 19, and is then locked down with a locking nut. If desired, cap screws 20a and 20b may be provided in nuts 18 and 19, respectively.

Turning of the end 7b of the agitation nozzle or pipe 7a is accomplished by turning the handle 10 located near the top of the pump. This handle is connected to the control shaft 9, which may be a one inch pipe, and the lower end of the control shaft is connected to the nozzle or pipe 7a by any suitable means, e.g. a universal joint. The universal joint 21 may be merely a steel block 1 inch × 1 inch, 2 inches long. the connection may be made by two bolts 22 and 23 serving as pins at 90° or right angle to each other, one end of the block being connected to the control shaft 9 and the other end being connected to bracket 24 which is welded to the outside bend of nozzle or pipe 7a, which may be a 2½ inch pipe, i.e. 2½ inside diameter and 3 inches outside diameter. The discharge pipe 11 has an elbow 11a and a 2 inch long nipple 12, each of which has a 3 inch inside diameter. The nipple 12, which is turned into the elbow 11a, is cut back 1 inch on the side with which the end 7b of the agitation nozzle 7a first comes in contact; and the back side of this nipple, about 180°, which is not cut out, serves as a stop for the nozzle. This aligns the connection of the end of the agitation nozzle 7b to the discharge pipe. Because we have one stationary object (nipple 12) and one movable object (end 7b of pipe 7a) on a limited radius, it is desirable to have about 1/16 inch clearance at end 7b at this connection. This 1/16 inch clearance is part of the 1 inch cutback in the nipple 12. The uncut part of the nipple, which would be on the back side, or the side that nozzle end 7b rests against when it is in discharge position, serves as a positive stop for the rotation of the agitation nozzle. This is one end of the 280° swing of the nozzle.

FIG. 5 shows the nozzle or pipe end 7b in its extreme counterclockwise position for discharge and also, in dotted lines, shows the nozzle 7b turned clockwise (by handle 10) into a position for agitation.

Nipple or pipe 7, 2 inches long and 2½ inches inside diameter (3 inches O.D.) is welded to the top side of the impeller housing 2, beyond the sweep of the impeller blades, in alignment with a hole therethrough, i.e. opening 2a (see FIG. 6).

The panel or plate 13 may be 7½ inches in diameter, with a hole in the center through which control shaft 9 extends. Handle 10, connected to the control shaft, may be 12 inches long. Near the outside circumference of plate 13 holes are located, one hole being positioned so that when the steel peg in the lower side of handle 10 is inserted in it, this will keep nozzle 7b in alignment with the elbow 11a connected to the discharge pipe, and the other holes being located in increments of about 2 inches in a clockwise direction. Because of the presence of the drive shaft 4, the nozzle 7b can only be rotated about 280°, but a full 360° of coverage may be attained by turning my device where the frame 15 rests on the floor 1 which surrounds the porthole (as shown in FIG. 1).

In the upper frame, elements 15 are each ¼ inch × 2 inches × 3 inches angle irons, fastened by ¼ inch × 3 inches steel straps 16 to an adjustable collar which surrounds the discharge pipe 11, and is further supported by ¼ inch × 1 inch × 2 inches angle irons 15a. In the lower frame, angle irons 15b are fastened to the discharge pipe 11, as shown, and channel iron 15c is fastened to each at its lower end, and by angle braces 15d. The leg member 15e, welded to the lower side of channel member 15c, serves to space the impeller housing 2 and knives 26 above the floor of the pit.

The housing 2 of the impeller (e.g. see FIGS. 5 and 9) is underneath and its upper plate is bolted to channel iron 15c, beyond the periphery of the housing. The housing 2 is made of 3/16 inch welded plate steel, and the lower plate (having central opening 6) can be readily removed, and replaced, by the bolts shown, which are welded to the sides of the housing. The housing has an inside diameter of 7½ inches throughout much of its circumference, but extends beyond that, in a generally spiral configuration, where the pipe nipple 7 is welded in alignment with the exit port 2a: see FIGS. 6 and 10. The inside dimension of the housing is about 10½ inches where the exit port is located and, at 90° thereto, the diameter is about 7½ inches. The impeller blades 3 are (a) welded to a circular disc 3a about 7¼ inches in diameter and 5/16 inch thick and (b) to hub or collar 3b, and the impeller blades rotate in close tolerance with the inside of the housing and have a depth of about 2 inches. The exit port 2a is beyond the circumference or sweep of the impeller blades 3 and liquid is driven out through it by centrifugal force, the impeller having a velocity of about 1700 r.p.m.

The impeller is driven by drive shaft 4, connected at its top end to electric motor 5 with a flexible coupling, e.g. a "Lovejoy" coupling. The lower end of the drive shaft 4 extends through bearing housing 25 and is supported by two bearings shown therewithin (see FIG. 9) and the end of shaft 4 extends through a round hole in the top of the impeller housing and is connected to the impeller collar 3b by a shear pin 3c. The collar 3b has an outside diameter of approximately 2¼ inches. The bearing housing is welded and trussed to the top of channel frame 15c.

In the lower side of the impeller housing 2, in concentric alignment with drive shaft 4, there is an intake opening or inlet port 6, 3 inches in diameter. Cutting knives 26 are welded to surfaces of collar 3b and to disc 3a. The knives are made of 5/16 inch × 1⅛ inches material and each is about 4 inches long. The knives stick out about 2½ inches beyond the face of the inlet port 6 and are sharpened, from the inside, on their leading edges (in the direction of rotation) and preferably have their trailing edges ground off, from the outside (see FIG. 11). These knives 26 extend outwardly through port 6 generally parallel to the axis of drive shaft 4, and generally perpendicular to the plane of rotation of the impeller blades 3, but are curved toward each other at their ends (see FIG. 9). The knives are 2¼ inches apart where they are attached to collar 3b and may be 1 inch to 1½ inches, e.g. 1¼ inches, apart at their ends. By sharpening the leading edge of each knife from the inside (instead of from the outside) the revolving knives function somewhat like a propeller blade and create a current of slurry toward and through inlet port 6. This effect can be increased, if desired, by fastening the knives 26 to the periphery of collar 3b with their leading edges turned slightly outward (instead of being tangential to the periphery). Also, if desired, the width of the knife, e.g. 1⅛ inches, may be shaped in accordance with the principles which dictate the optimum contour of boat propellers. However, for most uses, I get sufficient force-feed with my knives as illustrated, with economy in power comsumption.

It will be seen that extension 15e of frame element 15b protects the knives against contact or impact with the floor of the pit.

The electric motor 5 may be of 5 h.p. or 7½ h.p., depending upon the height of pumping above the liquid level. The motor is preferably equipped with a thermal overload protector or circuit breaker.

The specific embodiment of my pump, hereinabove described, has a pumping capacity of 350 gallons per minute or more (rated on liquid manure). When the pipe end or nozzle 7b is turned out of registry with the discharge or loading pipe, and is in agitation position, it will effectively agitate and mix liquid manure within a radius of about 15 feet or more from the end of nozzle 7b.

Having an electric motor connected directly to the impeller shaft, I eliminate an expensive gear box and a power takeoff (PTO) shaft, needed when a pump is driven by a farm tractor. Additionally, this reduces friction and vibration very considerably. Also, many farms are supplied with electricity by the Rural Electrification Administration (REA) and, of these, many (and, I believe, most) have available only single phase electric current and hence have a limit of about 10 h.p. of electric power. My pump, as herein described, even if increased significantly in capacity, can be operated effectively with such power supply.

Various liquid manure pumps now in use call for approximately 35 to 50 h.p. to drive them. This power is usually supplied by the PTO of a farm tractor. It is frequently necessary to run a pump for 1, 2 or 3 days to agitate the liquid manure before attempting to pump it into tanks for distribution on the land. Using a diesel tractor (which is probably the most economical of farm tractors) this might call for 25 to 75 gallons of fuel to power the agitation. My pump, I believe, is considerably more economical.

Prior liquid manure pumps with which I am familiar have two pipes coming out of the impeller housing, one for agitating and one for discharge. Each pipe has a shut-off valve in it, usually of the sliding gate type. The valve in the discharge pipe is closed and the other one is open when the pump is to be used for agitation and, vice versa, the valve in the agitation pipe is closed and the other open when the pump is to be used for discharging liquid manure from the pit and loading it in a tank. Each of the sliding gate valves has a loose or wide tolerance fitting, e.g. ⅛ inch clearance, plus wear. This loose tolerance is needed so that the valve can be actuated more freely, as there is a great deal of pressure exerted by the impeller against the underside of the valve when it is closed or partially closed. Because of this valve structure and arrangement and the fibrous nature of the liquid manure, there is leaking through the valve in the agitation pipe during discharge (which is not serious) and leaking through the discharge pipe when agitation is desired (which is serious). When the discharge pipe cannot be closed off completely because material or fibers jam the valve (even though the valve in the discharge pipe, according to the operating handle at the surface, appears to be closed off), liquid manure continues to pass through the discharge pipe and drop on the ground or pavement in the loading area. This is obviously unsightly and unpleasant, as well as wasteful. Because of this problem in the past it has been suggested that two pumps be used, one for agitation and the other for discharge or loading; then the pump for discharge would be shut off when a tank had been filled. But, as pointed out above, this solution for the problem is expensive and wasteful. With my pump, when a tank or truck has been loaded, my nozzle end 7b is turned away from the discharge pipe (and into agitating position), removing pressure from the discharge pipe, whereupon the liquid manure in the discharge pipe drains back into the manure pit, thus maintaining the loading area in a clean and sanitary condition.

The nozzle end 7b may be turned by handle 10 through an arc of about 280°. A complete and overlapping circumference of agitation may be effected by turning the pump on the pumping port about 90° or more, in either direction. This cannot be done with a conventional tractor-driven pump.

Beside being useful in pumping out of main pump ports, my apparatus can be used for pumping or agitating inside of buildings, in corners and behind columns, where tractor hookups cannot be made. This allows the operator to give very little of his time to my pump while it is in operation. Also, its simplicity of design and limited number of moving parts render it practically maintenance free. It has one zerc grease fitting, fed by grease line 27, which is used to lubricate the two impeller bearings within the bearing housing 25.

While I have described my valveless pump with a particular impeller, electric motor, an outlet port on the side of the impeller housing, etc., its valveless feature may be employed with other impellers or pumps, with other power sources (including PTO of a farm tractor, if desired), and with other arrangement of parts, as will be apparent to those skilled in the art. I have found that I can lengthen discharge pipe 11 and shorten pipe 7a, so that the connection for discharge comes midway between the connection shown in FIG. 5 and channel iron 15, thus permitting shortening of elements 15b and 15d, with good results. Also, the size of the pumping apparatus, and of its parts, is illustrative only, and may be increased or decreased, as desired. While my apparatus was developed particularly with a view to agitating and pumping liquid manure, it may also be employed with other materials, especially other slurries.

Variations and embodiments within the scope of the appended claims are comprehended.

What I claim:

1. In an apparatus for transferring a liquid slurry from a storage pit, in combination, a unitary frame structure adapted to be moved from pit to pit comprising a discharge pipe carried by said frame and adapted to have one end extending into said pit for discharge of the slurry, an impeller supported by said frame and submerged in the slurry and located adjacent to the bottom of the pit, a conduit extending from the impeller, said conduit having a substantial vertical component and a generally horizontally directed free end adapted to be rotated in a generally horizontal plane, without rotation of the pump, for emitting said slurry from said free end a substantial distance above the bottom of the pit, means on said frame including a shaft extending out of said pit for moving the free end of said conduit into registry with said discharge pipe for transferring said liquid slurry from the pit, and for moving it out of registry therewith for agitating said slurry in the pit by recirculation through said impeller.

2. In an apparatus for agitating or transferring a liquid slurry from a storage pit, the combination comprising:
   a. an impeller means adapted to be submerged in the liquid slurry;
   b. a discharge pipe adapted to have one end extending into said pit and the other end extending above the pit for transfer to a receptacle, the lower end of said pipe being adapted to receive a conduit in registry therewith; and
   c. a rotatably mounted conduit connected to and receiving the output of said impeller means and having a free end disposed generally horizontally at a level above said impeller means, said conduit being adapted to direct the output of said impeller means into said discharge pipe when its free end is rotated in a generally horizontal plane into registry with said discharge pipe and when out of registry with said discharge pipe to agitate said slurry in said pit by recirculation through the impeller means; said discharge pipe and said impeller means being supported by a frame in fixed relation to each other, and said conduit being rotatably joined to said impeller means, whereby the free end of said conduit may be brought into registry with said discharge pipe by rotating it in a generally horizontal plane.

3. The apparatus as defined in claim 1 wherein said frame structure is fastened to the discharge pipe at points adapted to be located well above the liquid level in the pit, an electric motor fastened to and supported by said frame, a second frame fastened to the discharge pipe at points adapted to be positioned below the liquid level in the pit, said impeller being fastened to and supported by said second frame, and a drive shaft connected at its upper end to said motor and at its lower end with the impeller so as to drive the impeller.

4. An apparatus as defined in claim 2 wherein said impeller means includes a central drive shaft connected to a collar to which impeller blades are fastened, adapted to revolve in a generally horizontal plane within an impeller housing, an inlet port in the lower side of said housing in generally concentric relation to the said shaft and collar, and knives fastened to said collar and extending downwardly through said inlet port, said knives being generally parallel to the axis of said shaft and collar and extending in the same direction at their point of attachment but curved toward each other at their ends, said knives serving to cut up fibrous and other solid material in said slurry and to force-feed said impeller means.

* * * * *